United States Patent
Yan et al.

(10) Patent No.: US 12,340,313 B2
(45) Date of Patent: Jun. 24, 2025

(54) NEURAL NETWORK PRUNING METHOD AND SYSTEM VIA LAYERWISE ANALYSIS

(71) Applicant: Moffett International Co., Limited, Kowloon (HK)

(72) Inventors: Enxu Yan, Los Altos, CA (US); Dongkuan Xu, Los Altos, CA (US); Jiachao Liu, Los Altos, CA (US)

(73) Assignee: MOFFETT INTERNATIONAL CO., LIMITED, Hong Kong (CN)

( * ) Notice: Subject to any disclaimer, the term of this patent is extended or adjusted under 35 U.S.C. 154(b) by 1236 days.

(21) Appl. No.: 17/107,046

(22) Filed: Nov. 30, 2020

(65) Prior Publication Data
US 2022/0172059 A1    Jun. 2, 2022

(51) Int. Cl.
*G06N 3/082* (2023.01)
*G06N 3/045* (2023.01)
*G06N 3/063* (2023.01)

(52) U.S. Cl.
CPC ............. *G06N 3/082* (2013.01); *G06N 3/045* (2023.01); *G06N 3/063* (2013.01)

(58) Field of Classification Search
CPC ........ G06N 3/082; G06N 3/045; G06N 3/063; G06N 3/044; G06N 3/084; G06N 3/0442; G06N 3/0464; G06N 3/0499; G06V 10/454; G06V 10/82
See application file for complete search history.

(56) References Cited

U.S. PATENT DOCUMENTS

| | | | |
|---|---|---|---|
| 11,995,551 B2* | 5/2024 | Koivisto | G06N 3/082 |
| 2016/0293167 A1 | 10/2016 | Chen et al. | |
| 2018/0336468 A1* | 11/2018 | Kadav | G06V 10/454 |
| 2019/0108436 A1* | 4/2019 | David | G06N 3/086 |
| 2019/0122394 A1* | 4/2019 | Shen | H04N 19/61 |
| 2019/0362235 A1 | 11/2019 | Xu et al. | |
| 2020/0160185 A1* | 5/2020 | Praveen | G06N 3/045 |
| 2020/0311552 A1* | 10/2020 | A | G06N 3/10 |
| 2020/0356860 A1* | 11/2020 | Kim | G06N 3/082 |
| 2020/0364572 A1* | 11/2020 | Senn | G06N 3/045 |
| 2021/0174175 A1* | 6/2021 | Choudhury | G06N 3/08 |

FOREIGN PATENT DOCUMENTS

| | | |
|---|---|---|
| CN | 111210016 A | 5/2020 |
| CN | 111461324 A | 7/2020 |
| CN | 111738401 A | 10/2020 |
| CN | 111931901 A | 11/2020 |

(Continued)

OTHER PUBLICATIONS

Lin et al. (NPL "Toward Compact ConvNets via Structure-Sparsity Regularized Filter Pruning", vol. 31, No. 2, Feb. 2020) (Year: 2020).*

(Continued)

*Primary Examiner* — Michael J Huntley
*Assistant Examiner* — Imad Kassim
(74) *Attorney, Agent, or Firm* — WOMBLE BOND DICKINSON (US) LLP

(57) ABSTRACT

Embodiments disclosed herein allowed neural networks to be pruned. The inputs and outputs generated by a reference neural network are used to prune the reference neural network. The pruned neural network may have a subset of the weights that are in the reference neural network.

17 Claims, 5 Drawing Sheets

(56) References Cited

FOREIGN PATENT DOCUMENTS

JP    2018129033 A    8/2018
TW     202042559 A   11/2020

OTHER PUBLICATIONS

Jian-Hao Luo et al. (NPL, "ThiNet: Pruning CNN Filters for a Thinner Net", vol. 41, No. 10, Oct. 2019) (Year: 2019).*
He et al. (NPL "Soft Filter Pruning for Accelerating Deep Convolutional Neural Networks", arXiv Aug. 21, 2018) (Year: 2018).*

* cited by examiner

NEURAL NETWORK PRUNING METHOD AND SYSTEM VIA LAYERWISE ANALYSIS

TECHNICAL FIELD

A method and system allows neural networks to be pruned. The inputs and outputs generated by a reference neural network are used to prune the reference neural network. The pruned neural network may have a subset of the weights that are in the reference neural network.

BACKGROUND

Neural networks, such as deep neural networks (DNNs), convolutional neural networks (CNNs), etc., have become a widely used approach in artificial intelligence (AI) for extracting high-level information from lower-level data such as image, video, audio and text. However, expensive computational cost of a neural network may deter its use in applications with tighter budgets on energy consumption, processing capacity/resources, storage space and/or latency tolerance. For example, edge devices such as mobile phones and surveillance cameras may not have large storage/processing resources, etc.

The computational cost of a neural network may result from a variety of sources. First, the neural network parameters can be in the order of millions or tens of millions, resulting in huge storage costs and can deter storage of the neural network parameters in the memory space. Second, the number of neurons in a neural network can consume a large memory space and may require billions of arithmetic operations during runtime. Third, search engines based on vector representations generated by neural networks, such as face comparison engines, can be computationally expensive, due in part to the high-dimensional dense vector representations (embeddings) of the neural networks.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A neural network may include thousands or millions of nodes and/or weights. Storing these weights and/or nodes may use a large amount of storage space. In addition, a larger amount of processing/computation resources may be used to execute the neural network 200 (e.g., to process/analyze input data using the neural network 200). For example, each of the weights may be applied to an input which increase the number of computations and/or operations performed by the neural network. Thus, it may be useful to reduce the number of weights/connections and/or nodes in the neural network. This would reduce the amount of storage space used to store the neural network and would reduce the processing/computation resources used.

Figure 1:
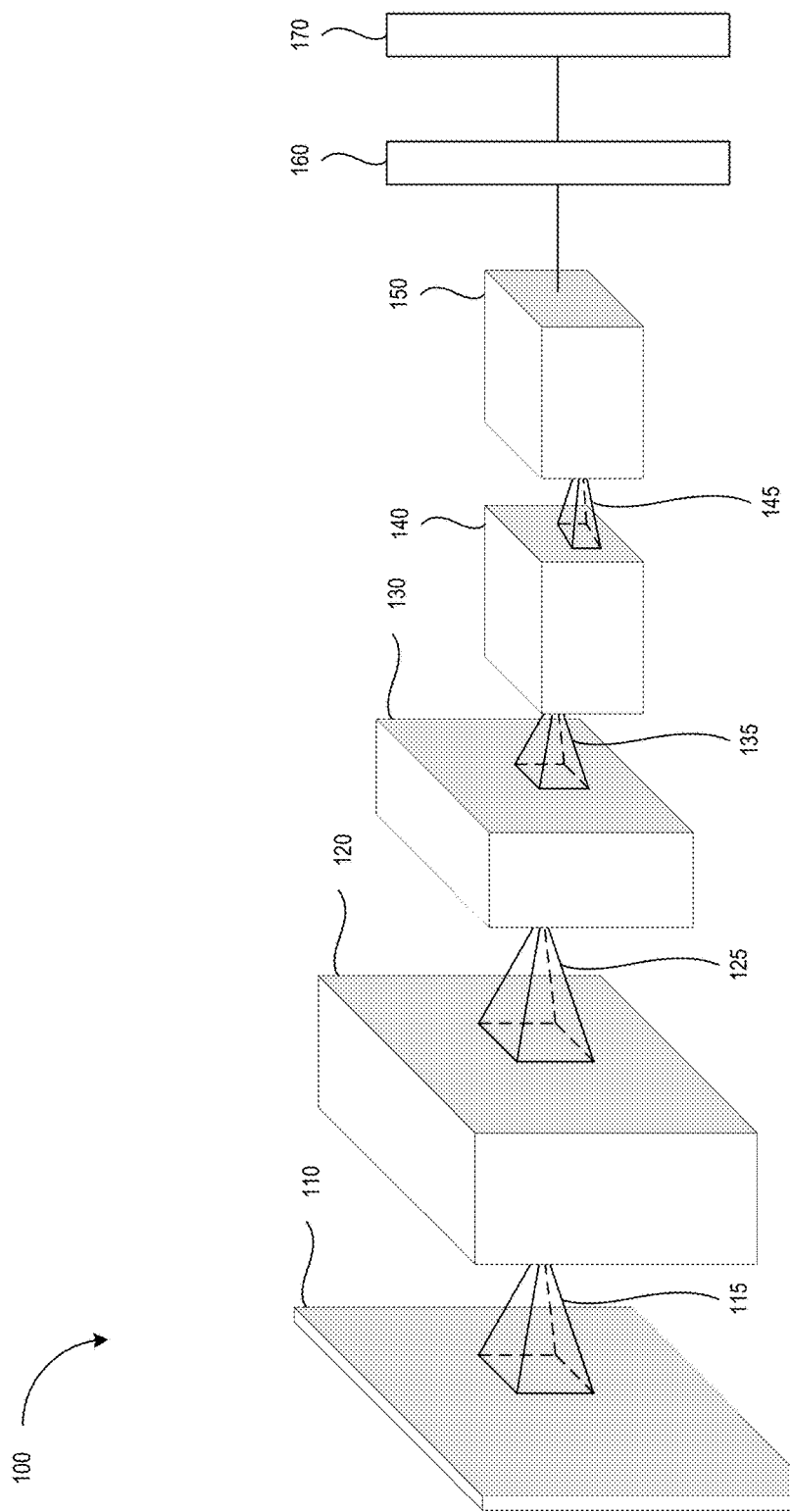
FIG. 1 is a diagram illustrating the operation of a neural network, in accordance with one or more embodiments of the present disclosure.

FIG. 1 is a diagram illustrating an example neural network 100, in accordance with one or more embodiments of the present disclosure. The neural network may be a deep neural network. A deep neural network may be a neural network that includes multiple intermediate layers (e.g., multiple layers of nodes and/or weights/connections between the nodes). In one embodiment, the neural network may be a convolutional neural network (CNN) which may be a type/class of deep neural network. The neural network (e.g., a CNN) may use convolution and pooling operations to process inputs and generate and output, such as an inference, decision, etc. A CNN may often be used to perform image analysis and/or processing.

As illustrated in FIG. 1, an input 110 may be provided to (e.g., passed into, fed into, etc.) the neural network 100. For example, the input 110 may include one or more images (e.g., digital images, pictures, etc.) that will be processed and/or analyzed the neural network 100. The input 110 may be processed by a first kernel 115. The first kernel 115 may also be referred to as a convolutional filter. A convolutional filter may include one or more kernels (e.g., convolutional kernels). For example, an input (e.g., an image) may have multiple channels (e.g., multiple input channels, such as a red, blue, green, input channel for each pixel of an image). The first kernel 115 may include a filter for each channel. The first kernel 115 may be used to perform a convolution operation on the input 110. The convolution operation may be a may refer to an operation may merge two sets of information into an output. For example, the first kernel 115 may include weights (e.g., values) that may be applied to portions of the input to generate an output. The first kernel 115 may also be referred to as a layer (e.g., an intermediate layer) of the neural network.

In one embodiment, the output generated by the first kernel 115 may feature map 120. The feature map 120 may be the result of applying the first kernel 115 (e.g., a set of weights) to the values of the input. For example, the feature map 120 may be the result of element-wise matrix multiplications and a sum of the result.

In one embodiment, the neural network 100 may also include and/or perform pooling operations that may be performed on the feature map 120. The pooling operation may refer to down-sampling a feature map, to reduce the height and weight of the feature map 120, while retaining the same depth. For example, max-pooling (E.g., a type of pooling which may user the maximum value in a pooling window) may be applied to the feature map 120. The feature map 120 may be the output of the first kernel 115 (e.g., the output of a first layer) and may also be the input provided to the second kernel 125 (e.g., the input of a second, subsequent layer).

The second kernel 125 may receive the feature map 120 (e.g., an input feature map) and may apply a convolution operation to the feature map 120 to generate the feature map 130. One or more pooling operations may be performed on the feature map 130, as discussed above. The feature map 130 may be the output of the second kernel 125 (e.g., the output of one layer) and may also be the input provided to the third kernel 135 (e.g., the input of another, subsequent layer). The third kernel 135 may receive the feature map 130 (e.g., an input feature map) and may apply a convolution operation to the feature map 130 to generate the feature map 140. One or more pooling operations may be performed on the feature map 140, as discussed above. The feature map 140 may be the output of the third kernel 135 (e.g., the output of one layer) and may also be the input provided to the fourth kernel 145 (e.g., the input of another, subsequent layer).

The fourth 145 may receive the feature map 140 (e.g., an input feature map) and may apply a convolution operation to the feature map 140 to generate the feature map 150. One or more pooling operations may be performed on the feature map 150, as discussed above. The feature map 150 may be the output of the fourth kernel 145 (e.g., the output of one layer) and may also be the input provided to the full connected layer 160.

As illustrated in FIG. 1, the neural network 100 also includes full connected layers 160 and 170. In one embodiment, the fully connected layers 160 and 170 may use the outputs of the previous layers (E.g., the feature maps 120, 130, 140, and/or 150) and may generate the final output (e.g., the final inference, decisions, etc.) of the neural network 100.

Figure 2:
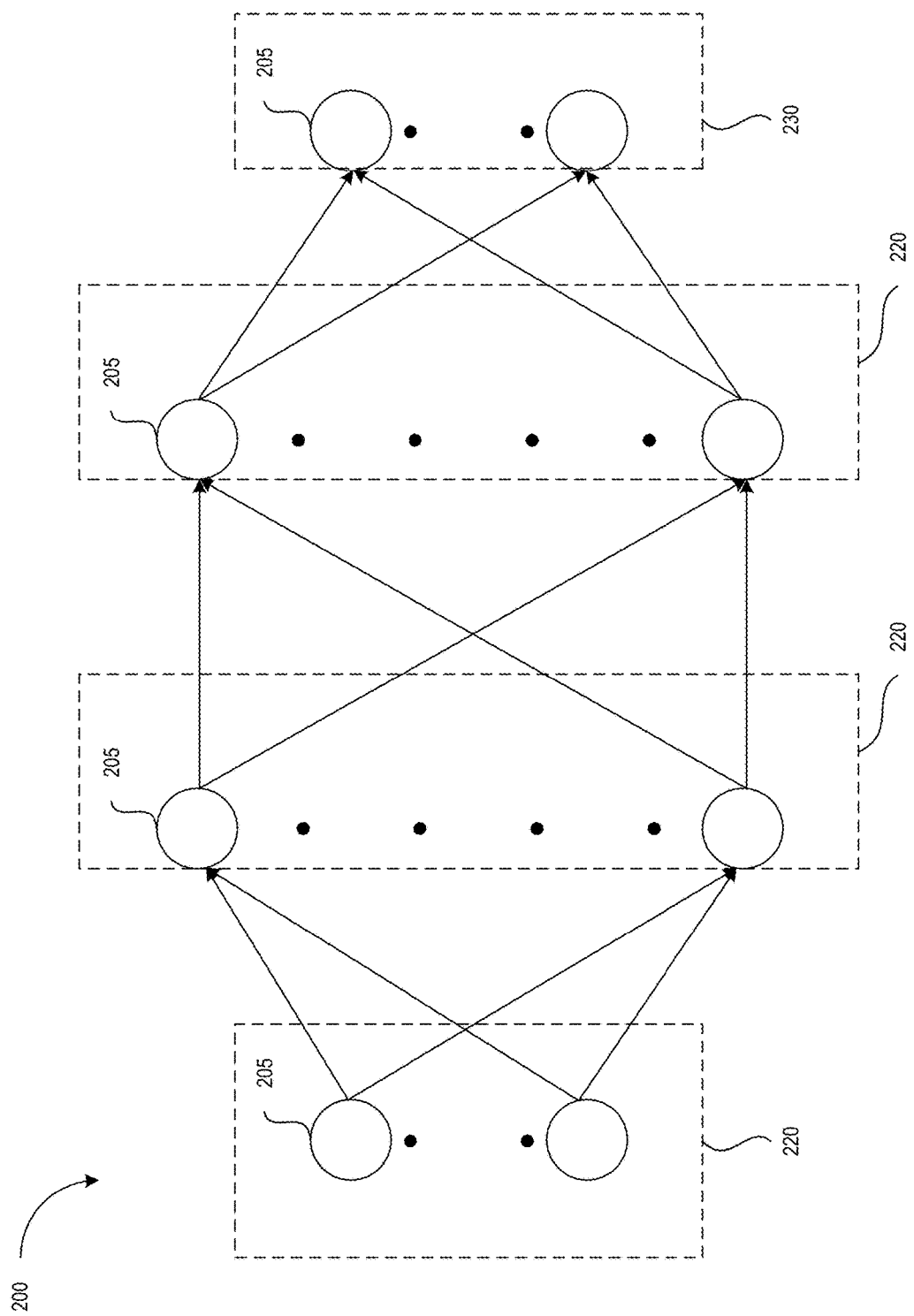
FIG. 2 is a diagram illustrating an example neural network, in accordance with one or more embodiments of the present disclosure.

FIG. 2 is a diagram illustrating an example neural network 200, in accordance with one or more embodiments of the present disclosure. The neural network 200 may be used to model relationships between (e.g., complex) inputs and outputs or to find patterns in data, where the dependency between the inputs and the outputs may not be easily ascertained. The neural network 200 may also be a computing model that may be used to determine a feature in input data through various computations. For example, the neural network 200 may determine a feature (e.g., a number, shape, pattern, etc.) in input data (e.g., audio data, image data, video data, etc.) according to a structure that defines a sequence of computations to be performed.

The neural network 200 may be a convolutional neural network (CNN). A CNN may be a feed forward neural network. A feed forward neural network may be a type of neural network where the connections between the nodes do not form a cycle. For example, the signals, messages, data, information etc., flow forward from the input layer 210 (e.g., from the input nodes), through intermediate layers 220, to the output layer 220 (e.g., to the output nodes) of the neural network 200 from left to right. The signals, messages, data, information etc., may not go backwards through the neural network (e.g., may not go from right to left). A CNN may be used for image analysis. The connections and/or their associated weights may take the form of a convolutional filter (and/or a convolutional kernel) that may be applied to an input (e.g., may be applied to different pixels of an image). Although the present disclosure may refer to image analysis for CNNs, in other embodiments, the CNN may be used for other types of data and inputs.

The neural network 200 includes an input layer 210, intermediate layers 220, and an output layer 220. Each of the input layer 210, the intermediate layers 220, and the output layer 220 includes one or more nodes 205. Each of the input layer 210, the intermediate layers 220, and the output layer 220 may have a different number of nodes 205. The neural network 200 may be a deep neural network (DNN) or a deep CNN. A neural network may be deep (e.g., a deep neural network) if there is more than one intermediate layer 220 (e.g., if there are four, ten, or some other appropriate number of intermediate layers 220). As illustrated in FIG. 2, the neural network 200 includes two intermediate layers 220 (e.g., two columns of nodes 205). In one embodiment, an intermediate layer 220 may include nodes 205 and connections/weights that are coupled to the nodes 205 in the intermediate layer 220. The nodes of an intermediate layer may receive input for the intermediate layer 220 (e.g., an output, such as a feature map, generated by a previous layer). The weights (e.g., a kernel/filter) may be applied to the inputs to generate an output of the current intermediate layer (e.g., a feature map).

Each of the nodes 205 in a layer is connected to either a node 205 in the next level (e.g., next sub-layer) or a node 205 in another layer, as represented by the arrows/lines between the nodes 205. For example, the nodes 205 in the input layer are each coupled to at least one node 205 in the first intermediate layer 220. Neural network 200 may be a fully connected neural network. For example, each node 205 in each layer or level is connector to each node in the subsequent layer or level where there is a subsequent layer or level (e.g., nodes 205 in the output layer 220 are not connected to other nodes).

Each connection may be associated with a weight or weight value (e.g., may have a weight). A weight or weight value may define coefficients applied to the computations. For example, the weights or weight values may be scaling factors between two or more nodes 205. Each node 205 may represent a summation of its inputs, and the weight or weight value associated with a connection may represent a coefficient or a scaling factor multiplied to an output of a node 205 in that connection. The weights between the nodes 205 may be determined, calculated, generated, assigned, learned, etc., during a training process for the neural network. For example, backpropagation may be used to set the weights such that the neural network 200 produces expected output values given corresponding values in labeled training data. Thus, the weights of the intermediate layers 220 can be considered as an encoding of meaningful patterns in the data. The weights of the connections between the nodes 205 may be modified by additional training.

Although neural network 200 is depicted with a particular number of nodes 205 layers, and connections, various neural network architectures/configurations may be used in other embodiments. For example, different fully connected neural networks and partially connected neural networks (e.g., where all nodes in adjacent layers are not connected) may be used.

Although the present disclosure may refer to convolutional neural networks, other types of neural networks and/or deep neural networks may be used in other embodiments. For example, a partially connected deep neural network, a recurrent neural network, long short-term memory (LSTM) neural network, etc., may be used in other embodiments.

As discussed above, the neural network 200 may include thousands or millions of nodes and/or weights. Storing the neural network 200 may use a large amount of storage space due to the large number of nodes and/or weights. In addition, a larger amount of processing/computation resources may be used to execute the neural network 200 (e.g., to process/ analyze input data using the neural network 200). Thus, it may be useful to reduce the number of weights/connections and/or nodes in the neural network 200. This would reduce the amount of storage space used to store the neural network and would reduce the processing/computation resources used.

Figure 3:
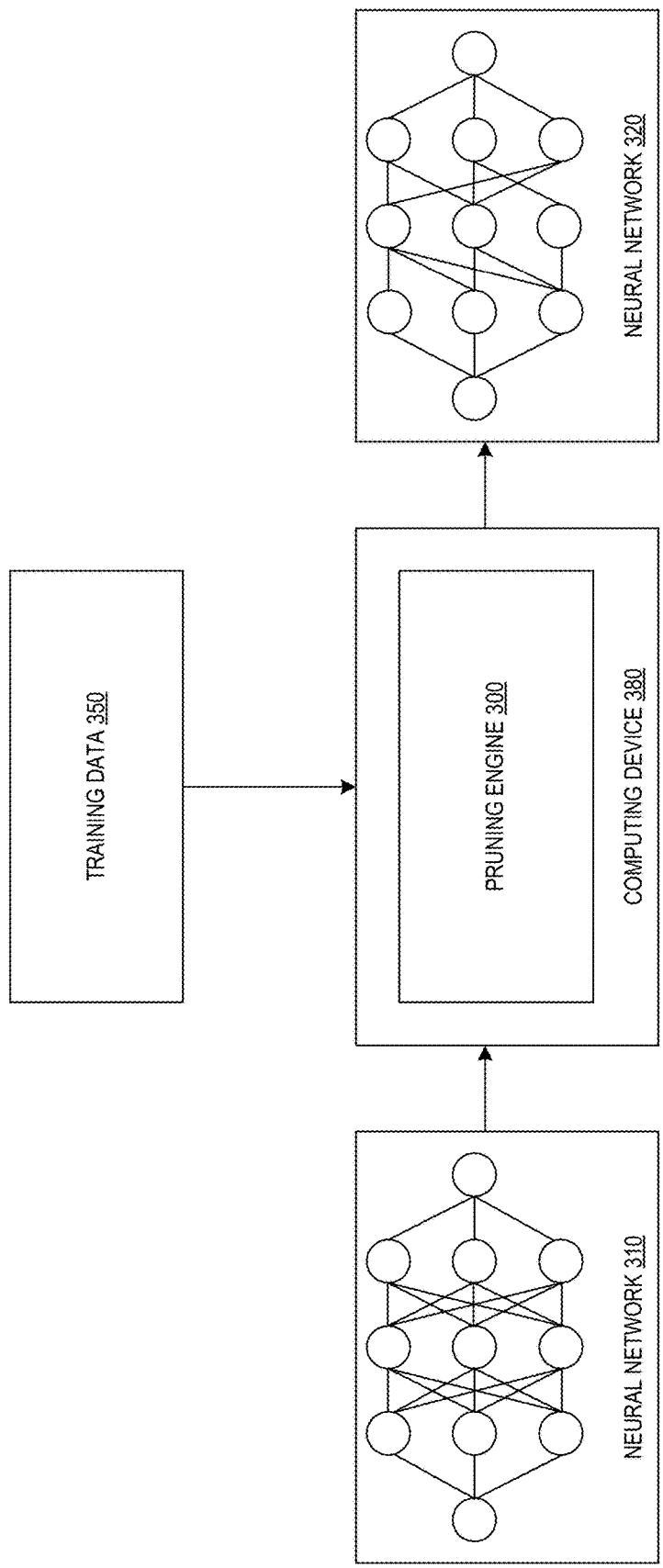
FIG. 3 is a diagram illustrating an example pruning engine, in accordance with one or more embodiments of the present disclosure.

FIG. 3 is a diagram illustrating an example pruning engine 300, in accordance with one or more embodiments of the present disclosure. The pruning engine 300 may be located in a computing device 380. The computing device 380 may include hardware such as processing devices (e.g., processors, central processing units (CPUs), programmable logic devices (PLDs), etc.), memory (e.g., random access memory (e.g., RAM), storage devices (e.g., hard-disk drive (HDD), solid-state drive (SSD), etc.), and other hardware devices (e.g., sound card, video card, etc.). The computing device 380 may be any suitable type of computing device or machine that has a programmable processor including, for example, server computers, desktop computers, laptop computers, tablet computers, smartphones, set-top boxes, etc. In some examples, the computing device 380 may comprise a single machine or may include multiple interconnected machines (e.g., multiple servers configured in a cluster). The computing device 380 may execute or include an operating system (OS). The OS may manage the execution of other components (e.g., software, applications, etc.) and/or may manage access to the hardware (e.g., processors, memory, storage devices etc.) of the computing device 380. Although the present disclosure may refer to a computing device 380, the pruning engine 300 may be located on other types of computing environment, such as virtual environments, in other embodiments. For example, the pruning engine 300 may be located in a virtual machine (VM), a container, etc., in other embodiments.

As discussed above, the neural network 310 may include thousands or millions of nodes and/or weights. Storing the neural network 310 may use a large amount of storage space due to the large number of nodes and/or weights. In addition, a larger amount of processing/computation resources may be used to execute the neural network 310 (e.g., to process/ analyze input data using the neural network 310). Reducing the number of weights/connections and/or nodes in the neural network (e.g., pruning the neural network, sparsifiying the neural network) may alleviate the issues discussed above.

However, a neural network is generally retrained after the neural network is pruned. As discussed above, training a neural network may be a time-consuming, processing intensive, and/or costly process. To train a neural network, training data 350 may be passed to (e.g., provided to) neural network hundreds or thousands of times before the weights of the connections between the nodes of the neural network are properly set. Passing the training data 350 through the neural network hundreds/thousands of times (or even more) may greatly increase the amount of time needed to train a neural network (e.g., days, weeks, etc.). In addition, passing the training data 350 through the neural network hundreds/ thousands of times may also use a significant amount of processing resources and/or power.

In one embodiment, the pruning engine 300 may obtain and/or analyze the neural network 310. For example, the pruning engine 300 may retrieve and/or access the neural network 310 from a data store (e.g., a memory, a disk drive, etc.). As illustrated in FIG. 3, the neural network 310 includes a set of nodes (illustrated as circles in the neural network 310) and a set of connections (illustrated as lines between the nodes/circles) that interconnect the nodes in the set of nodes. The connections between the nodes may also be referred to as weights. The neural network 310 may be referred to as an original neural network, a reference neural network, a teacher neural network, etc.

In one embodiment, the pruning engine 300 may generate the neural network 320 (e.g., a second neural network) based on the neural network 310 (e.g., a first neural network). The neural network 320 may include a subset of the connections that are in the neural network 310. For example, the neural network 320 may be generated by determining, selecting, identifying, etc., a subset of the connections from each layer of the neural network 310. The subset of the connections from each layer of the neural network 310 may be used to generate the neural network 320. The neural network 320 may also include a subset of the nodes that are in the neural network 310. For example, after selecting the subset of the connections from the neural network 310, some nodes in the neural network 320 may not be connected to any other nodes via a connection. These nodes may be removed from the neural network 320. Determining, selecting, identifying, etc., a subset of the connections and/or the nodes in a neural network may be referred to as pruning the neural network, scarifying the neural network, etc.

In one embodiment, the pruning engine 300 may generate the second neural network by analyzing intermediate layers of the neural network 310. For each of the intermediate layers of the neural network 310, the pruning engine 300 may determine (e.g., identify, select, etc.) a subset of the weights in each intermediate layer. The pruning engine 300 may use the different subsets of connections from each intermediate layer to generate the neural network 320. For example, the neural network 320 may have the same number of layers as the neural network 310. However, the neural network 320 may have few connections in one or more of the layers.

In one embodiment, the pruning engine 300 may generate the neural network 320 without training and/or retraining the neural network 320. For example, the pruning engine 300 may not use any training data to generate the neural network 320. The pruning engine 300 may generate the neural network 320 based on inputs that were provided to the different layers of the neural network 310 and based on reference that were generated by the different layers of the neural network 310, as discussed in more detail below. For example, each layer of the neural network 310 may receive input (e.g., input data, a feature map, the output of a previous layer, etc.) and may generate an output (e.g., a feature map) based on the input. The pruning engine may use the inputs and/or outputs of the intermediate layers of the neural network 310 to identify subsets of the connections (e.g., weights) to be used in the layers of the neural network 320. The inputs provided to the intermediate layers of the neural network 310 may be referred to as reference inputs and the outputs generated by the intermediate layers of the neural network 310 may be referred to as reference outputs.

In one embodiment, the pruning engine 300 may be capable of determining the subsets of connections for each of the layers of the neural network 320 simultaneously (or substantially simultaneously). As discussed above, the pruning engine 300 may have access to all of the reference inputs and reference outputs of the layers of the neural network 310. This may allow the pruning engine 300 to parallelize the determining of the subsets of connections for each intermediate layer of the neural network 320.

In one embodiment, the pruning engine 300 may generate the neural network 320 using the training data 350. However, when compared to a standard neural network training process, the pruning engine 300 may not provide the training data 350 to the neural network 320 hundreds or thousands of times. Instead, the number of times that the pruning engine 300 may pass the training data 350 to the neural network 320 may be smaller than the number of times the training data 350 was provided to the neural network 310 to train the neural network 310. For example, the training data 350 may be passed to the neural network 320 once or twice. The pruning engine may generate the neural network 320 based on reference outputs that were generated by the different layers of the neural network 310, as discussed in more detail below.

In one embodiment, the neural network 320 may be generated layer by layer. For example, the pruning engine 300 may generate the kernel/filter for the first layer based on an input provided to the neural network 320. That input may be used to generate a first filter based on a first reference output feature map (e.g., a feature map generated by the neural network 310). The input may be the training data 350. The output of the first filter may be used to generate the second filter. For example, the pruning engine 300 may determine the second filter based on a second reference output feature map and the output of the first filter. Thus, the filters of the neural network 320 may be generated sequentially, layer by layer.

As discussed above, the neural network 320 may be generated based on one or more of the neural network 310, reference inputs to the intermediate layers of the neural network 310, and reference outputs of the intermediate layers of the neural network 310. In one embodiment, the neural network 320 may be generated based on equation (1) below.

$$\min_W \|X * W - Y\|^2 + Q \qquad (1)$$

Equation (1) may be used and/or applied when determining (e.g., selecting, identifying, calculating, etc.) each of the intermediate layers of the neural network 320. For example, equation (1) may be applied/used to determine the connections/weights of an intermediate layer (e.g., a convolutional layer).

In one embodiment, the term X of equation (1) may represent one or more feature maps (e.g., one or more reference inputs) that were provided to an intermediate layer of the neural network 310. As discussed above, the neural network 320 may have the same number of layers as the neural network 310. Each intermediate layer of the neural network 320 may correspond to and/or may be associated with a layer of the neural network 310. The same feature maps (e.g., X) that were provided to a layer of the neural network 310 may be used to determine the connections/weights of a corresponding layer in the neural network 320. The one or more feature maps X may have the dimensions (e.g., shape) [N, H, W, C], where H is the height, W is the width, C is the number of input channels, and N is the number of samples (e.g., the number of feature maps). For example, multiple feature maps (e.g., N number of feature maps) may be included in X. Each of the feature maps may have three channels (e.g., C=3), one for red color, one for blue, and one for green.

In one embodiment, Y may be a reference output generated by a corresponding layer of the neural network 310. For example, Y may represent one or more feature maps that were generated by a corresponding layer of the neural network 310, based on the features maps X that were provided to the corresponding layer of the neural network 310. The one or more feature maps Y may have the dimensions (e.g., shape) [N, H, W, K], where H is the height, W is the width, K is the number of output channels, and N is the number of samples (e.g., the number of feature maps).

In one embodiment, W is the filter (e.g., one or more kernels that include connections/weights) that is to be determined for a layer of the neural network 320. For example, W may be the filter that will be included in a corresponding layer of the neural network 320. Thus, equation (1) may indicate that the pruning engine 300 is obtaining (e.g., determining, calculating, etc.) a W (e.g., a filter) that minimizes the difference between Y (e.g., the reference output) the result when filter W is applied to the input X. W may have the dimensions (e.g., shape) [R, S, C, K], where R is the height, S is the width, C is the number of input channels, and K is the number of output channels. The filter W may be applied to the input X in a convolution operation (e.g., the "*" operation in equation (1)).

Equation (1) can be represented (e.g., decomposed, deconstructed, converted, simplified, etc.) into K independent problems, one problem for each output channel k. Equation (2) below may be used to represent each of the K independent problems.

$$\min_{W_k} \|X * W_k - Y_k\|^2 + Q_k 1 \qquad (2)$$

As discussed above, the term X of equation (1) may represent one or more feature maps (e.g., one or more reference inputs) that were provided to an intermediate layer of the neural network 310. The term $Y_k$ may represent a reference output for an output channel k, generated by a corresponding layer of the neural network 310. $W_k$ may represent the filter (e.g., one or more kernels that include connections/weights) that is to be determined for an output channel k for a layer of the neural network 320. $W_k$ may have the dimensions (e.g., shape) [R, S, C], where R is the height, S is the width, and C is the number of input channels.

The convolution operation (e.g., "*") may be reduced to R×S matrix multiplication problems, each of C variables as illustrated in equation (3) below:

$$\min_{w_{r,s} \in \mathbb{R}^C} \left\| \sum_{r,s} X^{r,s} w^{r,s} - Y_k \right\|^2 \qquad (3)$$

$X^{r,s}$ may be a feature map with dimensions [N, H, W, C]. As discussed above, H is the height, W is the width, C is the number of input channels, and N is the number of samples (e.g., the number of feature maps). $X^{r,s}$ may be obtained (e.g., generated, calculated, determined, etc.) by shifting X along the H-axis by r and by shifting X along the W-axis by s.

The terms of equation (3) may be modified to generate equation (4) below:

$$\min_{w_{r,s} \in \mathbb{R}^{R*S*C}} \|\mathbb{X}w - y_k\|^2 \qquad (4)$$

Referring back to equation (3), $w^{r,s}$ may be stacked to form the vector w of equation (4). The vector w may have a size R×S×C. In addition, $X^{r,s}$ of equation (3) may be stacked to obtain (e.g., generate) the matrix $\mathbb{X}$ of equation (4). The matrix $\mathbb{X}$ may have the size/dimensions [(N×H×W), (R×S×C)]. For example, the matrix $\mathbb{X}$ may obtained by taking each of the different feature maps $X^{r,s}$ and stacking them one on top of each other (e.g., a second feature map $X^{r,s}$ is stacked under a first feature map $X^{r,s}$, a third feature map $X^{r,s}$ is stacked under the second feature map $X^{r,s}$, etc.). $Y_k$ of equation (3) may be flattened to obtain the vector $y_k$ of equation (4). Using equation (4) may allow the convolution operations of equation (3) to be converted into matrix multiplication operations. The Equation (4) can be further modified as illustrated in equations (5a), (5b), and 5(c).

$$\|\mathbb{X} w - y_k\|^2 = tr((\mathbb{X} *w - y_k)^T (\mathbb{X} *w - y_k)) \qquad (5a)$$

$$tr((\mathbb{X} w - y_k)^T (\mathbb{X} w - y_k)) = tr(w^T \mathbb{X}^T \mathbb{X} w - 2w^T \mathbb{X}^T y_k + y_k^T y_k) \qquad (5b)$$

$$tr(w^T \mathbb{X}^T \mathbb{X} w - 2w^T \mathbb{X}^T y_k + y_k^T y_k) = w^T \mathbb{X}^t \mathbb{X} w - 2w^T \mathbb{X}^T y_k + y_k^T y_k \qquad (5c)$$

As illustrated in equation 5(a), $\|\mathbb{X} w - y_k\|^2$ may be rewritten as $tr((\mathbb{X} *w - y_k)^T (\mathbb{X} *w - y_k))$. The $tr( )$ operation may refer to a trace operation which determine the sum of the values that are located on the main diagonal of a matrix (e.g., the sum of the values starting from the upper left going towards the lower right of the matrix). The "T" in equation (5a) represents the transpose of one or more terms in equation (5a). Expanding the left side of the equation (5a) results in equation (5b). For example, the different terms may be multiplied with each other and added/subtracted to expand the left side of equation (5a). Equation 5(b) can be further simplified as illustrated in equation 5(c).

Referring to equation 5(c) above, the term $\mathbb{X}^T \mathbb{X}$ may be a matrix that has the dimensions (e.g., shape) [RSC, RSC], where RSC is the height and the width of the matrix (e.g., an RSC×RSC matrix). The term $y_k^T y_k$ may be a constant term that may not be used (e.g., may be ignored) when solving for w. The term $\mathbb{G}$ may be substituted for the term $\mathbb{X}^T \mathbb{X}$ in equation (5c) and the term $b_k$ may be substituted for the term $\mathbb{X}^T y_k$.

Based on the above equations (1) through 5(c) the pruning engine 300 may solve for the term w. For example, the pruning engine 300 may perform a regression analysis, a linear regression, and/or other statistical regressions to solve for the term w. Solving for the term w will result in a kernel for an intermediate layer of the neural network 320. As discussed above, the pruning engine 300 may determine (e.g., calculate, determine obtain, etc.) the kernels (e.g., one or more filters, convolutional filters, etc.) for each intermediate layer simultaneously and/or sequentially (e.g., layer by layer).

In one embodiment, the equations (1) through s may allow the pruning engine 300 to generate the neural network 320 (e.g., to determine the weights used in the kernels/filters of the neural network 320) without using any training data. For example, the pruning engine 300 may generate the kernels/filters using the inputs and/or outputs generated by the neural network 310 (e.g., a reference neural network, a teacher neural network, etc.). In another embodiment, the pruning engine 350 may generate the kernels/filters for the intermediate layers of the neural network 320 sequentially, layer by layer (e.g., the kernel for the first intermediate layer is generated, then the kernel for the second intermediate layer is generated, etc.). Generating the kernels layer by layer may allow the pruning engine 300 to pass the training data 350 through the neural network 320 a fewer number of times (e.g., one to two times) when compared to a general training process which may pass the training data through a neural network hundreds or thousands of times.

The pruning engine 300 may decrease the time, effort computational/processing resources, etc., that may be used to create a pruned (e.g., sparsified) neural network (e.g., neutral network 320). By refraining from using the training data 350 (e.g., not using the training data 350 at all) or by using the training data 350 a fewer number of times (e.g., one to two times), the pruning engine 300 may save time and/or resources when generating the neural network 320. For example, the pruning engine 300 may be able to generate the neural network 320 without passing the training data 360 through the neural network 320 hundreds or thousands of times. This may greatly increase the efficiency and/or reduce time it takes to prune a neural network.

Figure 4:
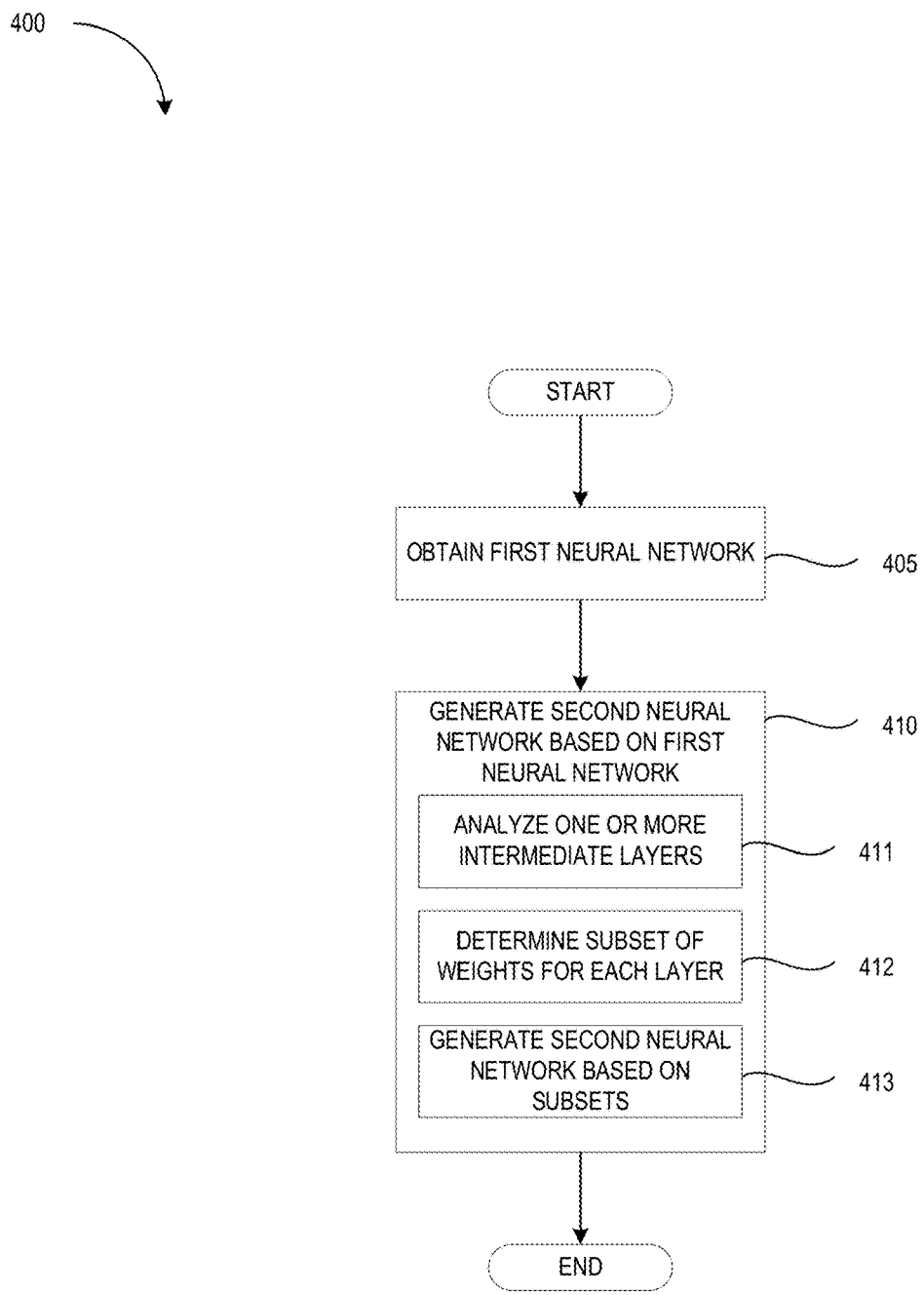
FIG. 4 is a flow diagram illustrating an example process for pruning a neural network, in accordance with one or more embodiments of the present disclosure.

FIG. 4 is a flow diagram illustrating an example process 400 for pruning a deep neural network, in accordance with one or more embodiments of the present disclosure. Process 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device (e.g., computing device 380 illustrated in FIG. 3) and a pruning engine (e.g., pruning engine 300 illustrated in FIG. 3).

With reference to FIG. 4, process 400 illustrates example functions used by various embodiments. Although specific function blocks ("blocks") are disclosed in process 400, such blocks are examples. That is, embodiments are well suited to performing various other blocks or variations of the blocks recited in process 400. It is appreciated that the blocks in process 400 may be performed in an order different than presented, and that not all of the blocks in process 400 may be performed. In addition, additional other blocks (not illustrated in FIG. 4) may be inserted between the blocks illustrated in FIG. 4.

The process 400 begins at block 405 where the process 400 obtains a first neural network. The first neural network may be a neural network that should be pruned (e.g., sparsified) to reduce the size of the neural network and/or to reduce the amount of computational/processing resources used. At block 410, the process 400 may generate a second neural network based on the first neural network.

Block 410 includes additional blocks 411, 412, and 413. At block 411, the process 400 may analyze one or more intermediate layers of the first neural network. For example, the process 400 may obtain the inputs (e.g., reference input feature maps) provided to the intermediate layers and/or the outputs (e.g., reference output feature maps) generated by the intermediate layers of the first neural network. At block 412, the process 400 may determine (e.g., identify, select, calculate, etc.) a subset of the weights for each intermediate layer. For example, each layer of the first neural network may include a set of weights. The process 400 may identify a subset of the weights in each layer to determine a corresponding layer of the second neural network. The process 400 may stack, flatten, and/or process various matrices to identify the set of weights for each layer, as discussed above. Selecting a subset of the weights may be referred to as generating a filters for a layer. In one embodiment, the process 400 may identify the subsets of the weights for each layer, simultaneously for all of the layers. For example, the process 400 may have access to the inputs and/or outputs generated by each layer of the first neural network. This may allow the process 400 to simultaneously generate a filter for each corresponding layer in the second neural network (e.g., to solve for W for all of the layers simultaneously). In another embodiment, the process 400 may generate each filter for each layer sequentially. For example, the process 400 may generate the next filter for a next layer after generating a current filter for a current layer. At block 413, the process 400 may generate the second neural network based on the subsets of weights identified for each layer.

Figure 5:
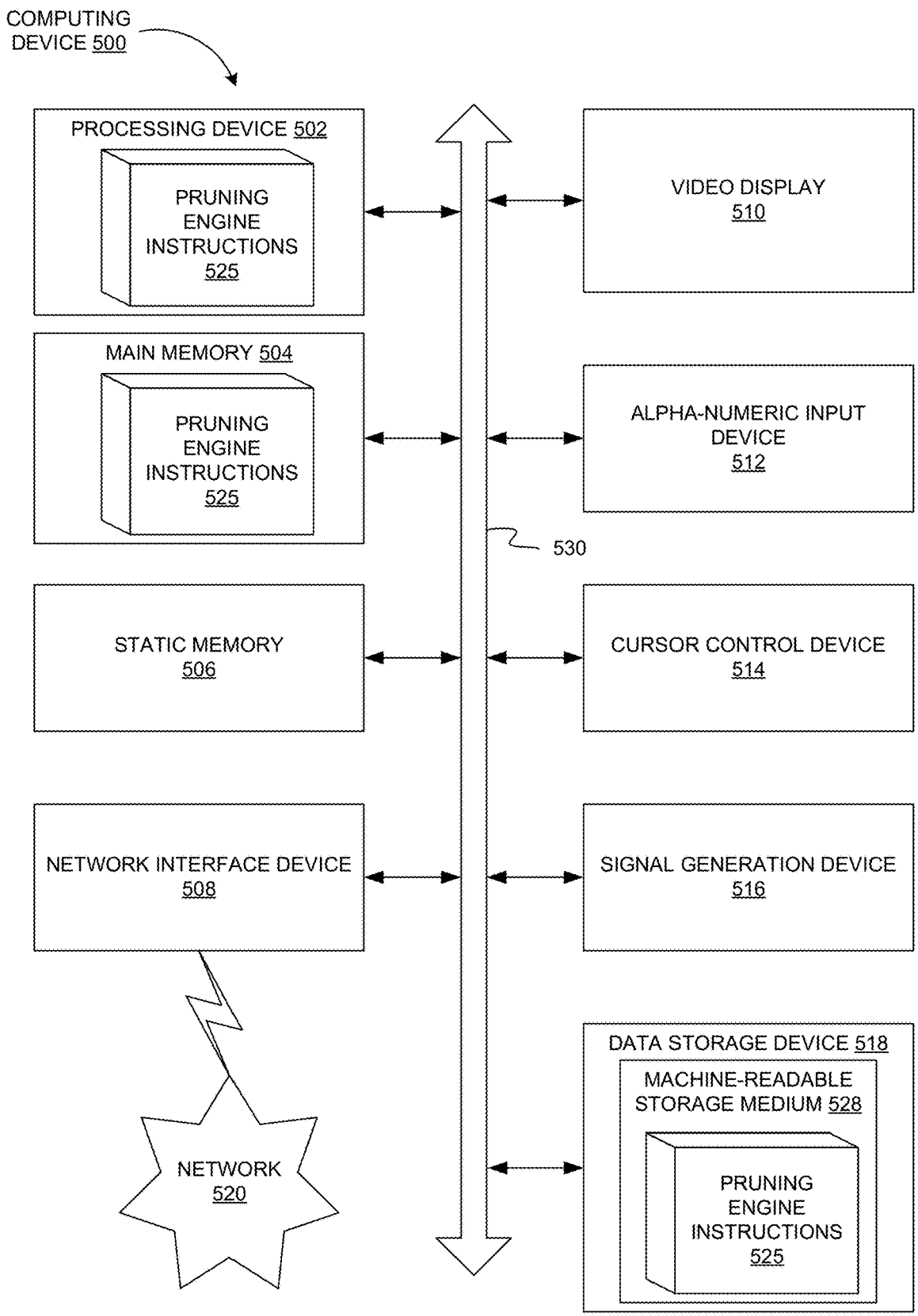
FIG. 5 is a block diagram illustrating an example computing device, in accordance with one or more embodiments of the present disclosure.

FIG. 5 is a block diagram of an example computing device 500, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a programmable logic device (PLD), etc.) 502, a main memory 504 (e.g., synchronous dynamic random access memory (DRAM), read-only memory (ROM)), a static memory 506 (e.g., flash memory), and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of pruning engine instructions 525, e.g., instructions for carrying out the operations described herein, in accordance with one or more aspects of the present disclosure. Pruning engine instructions 525 may also reside, completely or at least partially, within main memory 504 and/or within processing device 502 during execution thereof by computing device 500, main memory 504 and processing device 502 also constituting computer-readable media. The pruning engine instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "generating," "analyzing," "determining," "stacking," "flattening," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    obtaining a first neural network, wherein:
        the first neural network is trained using a first set of training data;
        the first neural network comprises a first set of nodes; and
        the first neural network comprises a first set of connections that interconnect the first set of nodes;
    generating a second neural network based on the first neural network, wherein generating the second neural network comprises
    analyzing a set of intermediate layers of the first neural network,
    determining subsets of weights for each intermediate layer of the intermediate layers, including generating, for each intermediate layer, a respective filter based on an input provided to the intermediate layer and a reference output, wherein the respective filter comprises a respective one of the subsets of weights, and
    generating the second neural network based on the subsets of weights for each intermediate layer, wherein:
        the second neural network comprises a second set of connections interconnecting a second set of nodes and the second set of connections comprises a subset of the first set of connections; and
        the second neural network is generated without using the first set of training data.

2. The method of claim 1, wherein the input is generated by:
    stacking a first set of input feature maps to generate a first combined feature map, wherein the input comprises the first combined feature map.

3. The method of claim 2, wherein the first set of input feature maps are generated by a first filter of the first neural network.

4. The method of claim 1, wherein the reference output is generated by:
    flattening an output feature map to generate a vector, wherein the reference output comprises the vector.

5. The method of claim 4, wherein the output feature map is generated based on a second filter of the first neural network.

6. The method of claim 1, wherein the subsets of weights for each intermediate layer are determined simultaneously for each intermediate layer.

7. The method of claim 1, wherein generating the second neural network comprises:
    generating the second neural network without training the second neural network.

8. The method of claim 1, wherein the second set of nodes comprises a subset of the first set of nodes.

9. A method, comprising:
    obtaining a first neural network, wherein:
        the first neural network is trained by passing a set of training data through the first neural network a first number of times;
        the first neural network comprises a first set of nodes; and the first neural network comprises a first set of connections that interconnect the first set of nodes;
generating a second neural network based on the first neural network, wherein generating the second neural network comprises
analyzing a set of intermediate layers of the first neural network,
determining subsets of weights for each intermediate layer of the intermediate layers, including generating, for each intermediate layer, a respective filter based on an input provided to the intermediate layer and a reference output, wherein the respective filter comprises a respective one of the subsets of weights, and
generating the second neural network based on the subsets of weights for each intermediate layer, wherein:
the second neural network comprises a second set of connections interconnecting a second set of nodes and the second set of connections comprises a subset of the first set of connections; and
the second neural network is generated by passing the set of training data through the second neural network a second number of times, wherein the second number of times is smaller than the first number of times.

10. The method of claim 9, wherein the input is generated by:
stacking a first set of input feature maps to generate a first combined feature map, wherein the input comprises the first combined feature map.

11. The method of claim 10, wherein the first set of input feature maps are generated by a previous layer of the second neural network.

12. The method of claim 9, wherein the reference output is generated by:
flattening an output feature map to generate a vector, wherein the reference output comprises the vector.

13. The method of claim 12, wherein the output feature map is generated based on a second filter of the first neural network.

14. The method of claim 9, wherein the subsets of weights for each intermediate layer are determine sequentially, layer by layer.

15. The method of claim 9, wherein the second set of nodes comprises a subset of the first set of nodes.

16. An apparatus, comprising:
a memory configured to store data;
a processor coupled to the memory, the processor configured to:
obtain a first neural network, wherein:
the first neural network is trained using a first set of training data;
the first neural network comprises a first set of nodes; and
the first neural network comprises a first set of connections that interconnect the first set of nodes;
generate a second neural network based on the first neural network, wherein generating the second neural network comprises
analyzing a set of intermediate layers of the first neural network,
determining subsets of weights for each intermediate layer of the intermediate layers, including generating, for each intermediate layer, a respective filter based on an input provided to the intermediate layer and a reference output, wherein the respective filter comprises a respective one of the subsets of weights, and
generating the second neural network based on the subsets of weights for each intermediate layer, wherein:
the second neural network comprises a second set of connections interconnecting a second set of nodes and the second set of connections comprises a subset of the first set of connections; and
the second neural network is generated without using the first set of training data.

17. The apparatus of claim 16, wherein the input is generated by:
stacking a first set of input feature maps to generate a first combined feature map, wherein the input comprises the first combined feature map.

* * * * *